(12) United States Patent
Benz et al.

(10) Patent No.: US 6,267,435 B1
(45) Date of Patent: Jul. 31, 2001

(54) HOLDING ARRANGEMENT FOR A MOUNTED VEHICLE ELEMENT AND METHOD OF MAKING SAME

(75) Inventors: Eberhard Benz, Gaertringen; Oliver Zolke, Boeblingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,320

(22) Filed: Dec. 23, 1999

(30) Foreign Application Priority Data

Dec. 23, 1998 (DE) .............................................. 198 59 802

(51) Int. Cl.⁷ ..................................................... B62D 65/02
(52) U.S. Cl. ............................................ 296/187; 296/192
(58) Field of Search .................................... 296/192, 37.1, 296/96.15, 187; 454/121, 156; 312/245

(56) References Cited

U.S. PATENT DOCUMENTS

| | | | |
|---|---|---|---|
| 1,976,276 | * 10/1934 | Aune ...................................... | 454/121 |
| 2,048,217 | * 7/1936 | Peterson ................................ | 454/121 |
| 2,295,146 | * 9/1942 | Welch .................................... | 454/121 |
| 2,621,830 | * 12/1952 | Stow et al. ...................... | 296/96.15 X |
| 5,676,338 | * 10/1997 | Wards et al. ...................... | 296/37.1 X |

FOREIGN PATENT DOCUMENTS

| | | |
|---|---|---|
| 4134436 | 4/1992 | (DE) . |
| 4424288 | 1/1996 | (DE) . |
| 2073678A | 10/1981 | (GB) . |

\* cited by examiner

*Primary Examiner*—Dennis H. Pedder
(74) *Attorney, Agent, or Firm*—Crowell & Moring, L.L.P.

(57) ABSTRACT

A holding arrangement for a mounted vehicle element on a three-dimensionally contoured supporting wall in a vehicle interior is provided for changing mounting situations. The holding arrangement has two holding elements which are fastened to the supporting wall in a mutually spaced manner, each holding element having a holding plate which, on one side, is constructed as a plane surface and on whose other side a cylindrical holding finger is fastened which extends perpendicularly to the plane surface. For the fastening of the holding elements, two mutually spaced fastening zones are constructed on the supporting wall which each have a plane surface to which the respective holding element is fastened while resting on it with the plane surface of its holding plate. The plane surface of the respective fastening zone is larger than the plane surface of the holding plate of the pertaining holding element. The plane surfaces of the fastening zones extend in parallel to one another. Corresponding to the holding fingers, the mounted vehicle element has two cylindrical receiving devices, into which the holding fingers can be introduced in their axial direction.

23 Claims, 1 Drawing Sheet

HOLDING ARRANGEMENT FOR A MOUNTED VEHICLE ELEMENT AND METHOD OF MAKING SAME

BACKGROUND AND SUMMARY OF THE INVENTION

This application claims the priority of German application 198 59 802.5, filed in Germany on Dec. 23, 1998, the disclosure of which is expressly incorporated by reference herein.

The invention relates to a holding arrangement for a mounted vehicle element on a supporting wall in the vehicle interior.

For example, a forward end wall, which extends transversely to the longitudinal direction of the vehicle, is arranged in the interior of a vehicle, which forward end wall separates an engine compartment from an occupant compartment in the vehicle. Furthermore, a rearward end wall may be provided in the vehicle which also extends transversely to the longitudinal direction of the vehicle and separates the occupant compartment from a trunk. Within the scope of the production line assembly, various mounted elements are provided on the forward end wall which may consist of individual assemblies or of complex structural components. So that the fastening of these mounted elements can be carried out as fast as possible for this series-type assembly, holding arrangements of the initially mentioned type are used. A holding arrangement of this type has supporting-wall-side holding elements which are fastened to the supporting wall and interact with mounted-element-side holding elements provided on the mounted element.

A conventional supporting wall, as, for example, the forward end wall, has a complex three-dimensional structure or contour formed as a function of desired stiffness characteristics, defined space conditions and installation situations. The supporting-wall-side holding elements are correspondingly adapted to this three-dimensional contour and, within the scope of the construction of the body shell, are fastened to this supporting wall, particularly by means of welding. Therefore, for every mounted variant for which the relative position of the fastening points for the mounted element changes on the supporting wall, new supporting-wall-side holding elements must be produced. These new supporting-wall-side holding elements are again specifically adapted to the three-dimensional contour of the supporting wall in the area of the new fastening point. The same applies to a body-shell-side tolerance which is carried out by a corresponding new positioning of the supporting-wall-side holding elements. The expenditures required for this purpose rise even more in the case of larger mounted elements which are held at two points on the supporting wall.

The present invention relates to the problem of further developing a holding arrangement of the initially mentioned type such that a bodyshell-side adaptation to varying installation conditions can be carried out in a simpler manner.

According to the invention, this problem is solved by means of a holding arrangement for a mounted vehicle element on a three-dimensionally contoured supporting wall in a vehicle interior, said holding arrangement comprising: two folding elements which are fastened to the supporting wall in a mutually spaced manner, each holding element having a holding plate whose one side is constructed as a plane surface and on whose other side a cylindrical holding finger is fastened which extends perpendicularly to the plane surface, and two mutually spaced fastening zones constructed on the supporting wall for the fastening of the holding elements, which fastening zones each have a plane surface to which the respective holding element is fastened while resting on it with the plane surface of its holding plate, wherein the plane surface of the respective fastening zone is larger than the plane surface of the holding plate of the pertaining holding element, wherein the plane surfaces of the fastening zones extend in parallel to one another, and wherein, corresponding to the holding fingers, the mounted vehicle element has two cylindrical receiving devices into which the holding fingers can be introduced in their axial direction.

The invention is based on the general idea of equipping the holding elements with one holding plate respectively which, on the one side, has a plane surface and, on the other side, has a cylindrical holding finger which extends perpendicularly to this plane surface. On the supporting wall, fastening zones are constructed for each holding element, which each have a plane surface on which the plane surface of the assigned holding elements rests, which is smaller than that of the supporting wall, for fastening the holding element. In this manner, the relative position of the holding elements can be varied in two dimensions transversely to the axial direction of the holding finger. Furthermore, the contact surfaces of the supporting-wall are aligned in parallel to one another so that a fitting-on direction for the mounted element exists which extends in parallel to the axial directions of the holding fingers. In this case, the mounted-element-side holding elements are constructed in the form of cylindrical receiving devices so that a plug-type connection is formed which can be rapidly assembled as the result of the holding fingers. Because of the axial course of the holding fingers, a position compensation is possible along the holding fingers, that is, in a third dimension, so that, on the bodyshell-side, as the result of the holding arrangement according to the invention, a three-dimensional positioning capability of the holding points of the mounted element is obtained relative to the supporting wall.

In order to simplify the mounting of the mounted vehicle element, the holding fingers are equipped at their axial free end with a cone which tapers toward the end and in the process forms an inserting aid.

The receiving devices may have a simple construction at reasonable cost if they have a receiving socket which contains a cylindrical opening corresponding to the holding fingers. Such a socket can be mounted in a particularly simple manner on the mounted vehicle element. In addition, such a socket may have a sound-absorbing and vibration-damping design in order to uncouple or insulate the mounted vehicle element in this respect from the supporting wall.

Additional important characteristics and advantages of the holding arrangement according to the invention are contained in the claims, in the drawing and in the pertaining description of the figures by means of the drawing.

It is understood that the above-mentioned characteristics and those which will be explained in the following can not only be used in the respective indicated combination but also in different combinations and alone without leaving the scope of the present invention.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of a coupling area between a supporting wall and a mounted vehicle element, constructed according to a preferred embodiment of the present invention.

DETAILED DESCRIPTION OF THE DRAWINGS

Figure 1:
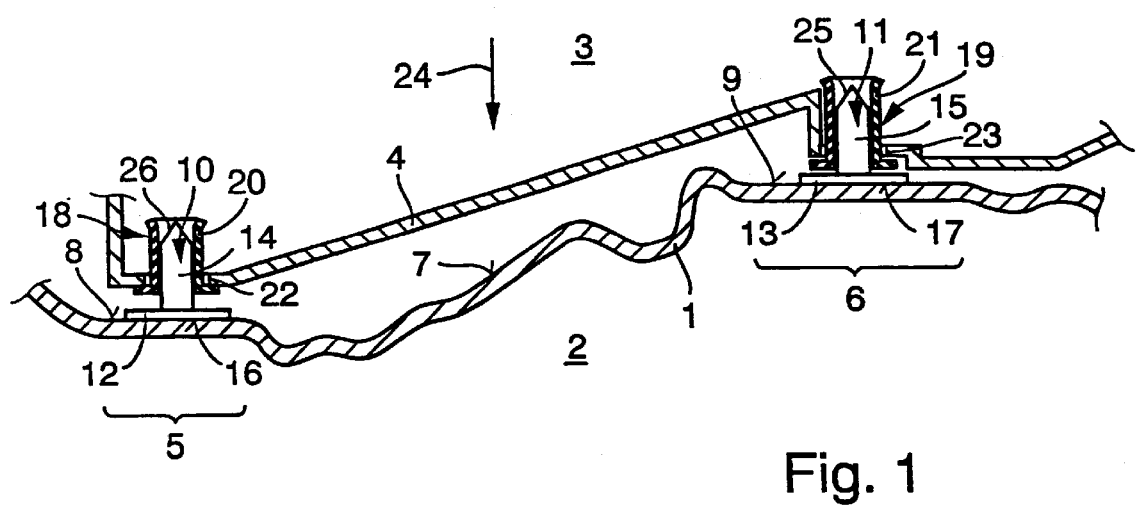

Referring to the drawing FIGURE, a forward end wall 1 of a motor vehicle otherwise not shown separates an engine compartment 2 from a vehicle occupant compartment 3. The end wall 1 has a three-dimensional structured surface contour. A heating system 4, of which only housing components are shown, is mounted on an exterior side 7 of the end wall 1 facing the occupant compartment 3 of the vehicle.

In order to fasten the heating system 4 on the end wall 1, the holding arrangement according to the invention is used. For this purpose, two mutually spaced fastening zones 5 and 6, which are each indicated by a curly bracket, are constructed on the end wall 1. On the exterior side 7 of the end wall 1 facing the heating system 4, these fastening zones 5 and 6 are each equipped with a plane surface 8 and 9. The plane surface 8 of one fastening zone 5 extends in parallel to the plane surface 9 of the other fastening zone 6.

The holding arrangement according to the invention also has two holding elements 10 and 11 which each consist of a holding plate 12 and 13 and of a cylindrical holding finger 14 and 15. On the side facing away from the holding finger 14 and 15, the holding plates 12 and 13 have a plane surface 16 and 17, by means of which they rest on the plane surface 8 and 9 of the respective assigned fastening zone 5 and 6. The holding fingers 10 and 11 each extend perpendicularly to the plane surface 16, 17 of the respective pertaining holding plate 12 and 13.

FIG. 1 illustrates that the plane surfaces 16 and 17 of the holding elements 10 and 11 are each smaller than the plane surfaces 8 and 9 of the respective assigned fastening zone 5 and 6. In this manner, the relative position of the holding elements 10 and 11 with respect to the end wall 1 within the fastening zones 5 and 6 may be varied two-dimensionally, specifically within the plane surfaces 16 and 17. In this manner, the holding elements 10 and 11, which are fastened within the scope of the construction of the bodyshell on the end wall 1, for example, by means of welding, can be adapted to new mounting situations. A change of the mounting situation may occur, for example, when a new heating system 4 or a different type of heating system 4 is to be mounted in the same vehicle. As a result, a bodyshell-side tolerance compensation can also be carried out, by means of which tolerances occurring during the subsequent mounting of the respective mounted vehicle elements 4 can be compensated in a back-coupled manner for later assemblies.

On the mounted-element-side, the holding arrangement according to the invention has cylindrical receiving devices 18 and 19 which, in the illustrated embodiment, are formed by cylindrical sockets 20 and 21 made of a plastic material. The sockets 20 and 21 are inserted into corresponding openings 22 and 23 which are recessed in the housing of the heating system 4. The sockets 20 and 21 preferably have a sound-absorbing and vibration-damping construction in order to acoustically insulate the occupant compartment 3 from the engine compartment 2. Since the holding fingers 14 and 15 are each fastened perpendicularly to the plane surface 16 and 17 on the respective holding plate 12 and 13 and because the plane surfaces 8 and 9 of the fastening zones 5 and 6 extend in parallel to one another, the axial directions of the holding fingers 14 and 15 also extend in parallel to one another, whereby a mounting direction 24 for the heating system 4 is obtained which is in parallel to these axial directions. As illustrated in FIG. 1, the heating system 4 may be held on the respective holding finger 14 or 15 in various axial positions, so that a further dimension is obtained along the axial direction of the holding fingers 14 and 15, for the compensation of the holding arrangement to changing mounting situations. Since the axial directions of the holding fingers 14 and 15 extend perpendicularly to the planes (8 and 9 or 16 and 17), in which the above-mentioned two-dimensional adapting of the holding arrangement can be carried out, on the whole, a three-dimensional adaptability of the holding arrangement will be obtained on the bodyshell side to changing mounting conditions.

The end wall 1 extends essentially transversely to the longitudinal direction of the vehicle. The plane surfaces 8 and 9 of the fastening zones 5 and 6 are preferably oriented such that they extend perpendicularly to the longitudinal direction of the vehicle so that the mounting direction 24 coincides with the longitudinal direction of the vehicle. The fastening zones 5 and 6 are spaced relatively far from one another in order to obtain a sufficient stability for the holding arrangement of the heating system 4. It is clear that the invention is not limited to a holding arrangement with only two holding elements, but that the general idea of the invention also comprises variants with three and more holding elements, in which case the respective assigned fastening zones of the supporting wall are further developed in a corresponding manner.

For facilitating the mounting, the axially free ends of the holding fingers 14 and 15 are provided with a cone 25 and 26 which tapers toward the axially free end. The holding elements 10 and 11 are preferably constructed as sheet metal parts which can be produced at reasonable cost.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Holding arrangement for a mounted vehicle element on an irregularly contoured supporting wall in a vehicle interior, said holding arrangement comprising:

two holding elements which are fastened to the supporting wall in a mutually spaced manner, each holding element having a holding plate in which one side of the holding plate is constructed as a planar surface and on an opposite side therefrom a cylindrical holding finger is fastened extending perpendicularly to the planar surface, and two mutually spaced fastening zones constructed on the supporting wall for the fastening of the holding elements, which fastening zones each have a planar surface to which the respective holding element is fastened while resting on the fastening zone with the planar surface of the respective holding plate, wherein each of the planar surfaces of the respective fastening zones is larger than the planar surface of the holding plate of the pertaining holding element, thereby allowing the relative position of the holding elements with respect to the supporting wall to be varied two-dimensionally upon fastening within the fastening zones, wherein the planar surfaces of the fastening zone are parallel to and separate from one another, and wherein, corresponding to the holding fingers, the mounted vehicle element has two cylindrical receiving devices into which the holding fingers can be introduced in an axial direction, and the fastening zones face the mounted vehicle element.

2. Holding arrangement according to claim 1, wherein each holding finger is equipped on an axially free end with a cone which tapers outwards in a direction of the axially free end.

3. Holding arrangement according to claim 1, wherein each receiving device has a socket which is inserted into a receiving opening provided on the mounted vehicle element.

4. Holding arrangement according to claim 2, wherein each receiving device has a socket which is inserted into a receiving opening provided on the mounted vehicle element.

5. Holding arrangement according to claim 1, wherein the supporting wall is formed by a forward end wall which separates an engine compartment from a vehicle occupant compartment and extends transversely to a longitudinal direction of the vehicle interior.

6. Holding arrangement according to claim 2, wherein the supporting wall is formed by a forward end wall which separates an engine compartment from a vehicle occupant compartment and extends transversely to a longitudinal direction of the vehicle interior.

7. Holding arrangement according to claim 3, wherein the supporting wall is formed by a forward end wall which separates an engine compartment from a vehicle occupant compartment and extends transversely to a longitudinal direction of the vehicle interior.

8. Holding arrangement according to claim 4, wherein the supporting wall is formed by a forward end wall which separates an engine compartment from a vehicle occupant compartment and extends transversely to a longitudinal direction of the vehicle interior.

9. Holding arrangement according to claim 5, wherein the mounted vehicle element is formed by a heating system which is arranged on an exterior side of the forward end wall facing the vehicle occupant compartment.

10. Holding arrangement according to claim 6, wherein the mounted vehicle element is formed by a heating system which is arranged on an exterior side of the forward end wall facing the vehicle occupant compartment.

11. Holding arrangement according to claim 7, wherein the mounted vehicle element is formed by a heating system which is arranged on an exterior side of the forward end wall facing the vehicle occupant compartment.

12. Holding arrangement according to claim 8, wherein the mounted vehicle element is formed by a heating system which is arranged on an exterior side of the forward end wall facing the vehicle occupant compartment.

13. Holding arrangement according to claim 1, wherein, the supporting wall extends transversely to a longitudinal direction of a vehicle, and the axial direction of the holding fingers extends in parallel to the longitudinal direction of the vehicle.

14. Holding arrangement according to claim 2, wherein the supporting wall extends transversely to a longitudinal direction of a vehicle, and the axial direction of the holding fingers extends in parallel to the longitudinal direction of the vehicle.

15. Holding arrangement according to claim 3, wherein the supporting wall extends transversely to a longitudinal direction of a vehicle, and the axial direction of the holding fingers extends in parallel to the longitudinal direction of the vehicle.

16. Holding arrangement according to claim 5, wherein the axial direction of the holding fingers extends in parallel to the longitudinal direction of the vehicle.

17. Holding arrangement according to claim 9, wherein the axial direction of the holding fingers extends in parallel to the longitudinal direction of the vehicle.

18. A method of mounting a vehicle element on an irregularly contoured supporting wall in a vehicle interior, comprising:

fastening two holding elements to the supporting wall in a mutually spaced manner, each holding element having a holding plate in which one side is constructed as a planar surface and on the opposite side therefrom a holding finger is fastened which extends perpendicularly to the planar surface, and providing two mutually spaced fastening zones on the supporting wall for the fastening of the holding elements, which fastening zones each have a separate planar surface to which the respective holding element is fastened while resting on the fastening zone with the planar surface of the respective holding plate, wherein each of the planar surfaces of the respective fastening zones is larger than the planar surface of the holding plate of the pertaining holding element, thereby allowing the relative position of the holding elements with respect to the supporting wall to be varied two-dimensionally upon fastening within the fastening zones, wherein the planar surfaces of the fastening zones are parallel to and separate from one another, and wherein, corresponding to the holding fingers, the mounted vehicle element has two receiving devices into which the holding fingers can be introduced in an axial direction, and the fastening zones face the mounted vehicle element.

19. A method according to claim 18, wherein each holding finger is equipped on an axially free end with a cone which tapers outwards in a direction of the axially free end.

20. A method according to claim 18, wherein the supporting wall is formed by a forward end wall which separates an engine compartment from a vehicle occupant compartment and extends transversely to a longitudinal direction of the vehicle interior.

21. A vehicle assembly comprising:

an irregularly contoured supporting wall which in use extends transversely of a passenger vehicle and separates a vehicle occupant space from another vehicle space, said supporting wall having two spaced parallel and separate planar support surfaces on the vehicle occupant side thereof, two holding elements which each include a holding plate with a holding planar surface fastened to the respective planar support surfaces of the supporting wall, said holding elements each including a holding finger extending perpendicular to the planar surfaces, and a vehicle element which has receiving devices engaging axially over the respective holding fingers, wherein each of the planar support surfaces of the supporting wall are larger than the respective holding planar surfaces of the holding elements to thereby accommodate lateral adjusting positioning of the holding elements and thereby the vehicle element.

22. A vehicle assembly according to claim 21, wherein the vehicle element is a vehicle heater.

23. A vehicle assembly according to claim 22, wherein the supporting wall is a fire wall separating a vehicle engine space and the occupant space.

* * * * *